United States Patent
Hinz et al.

[19]

[11] Patent Number: 5,865,511
[45] Date of Patent: *Feb. 2, 1999

[54] ELECTROHYDRAULIC PRESSURE CONTROL MECHANISM

[75] Inventors: Axel Hinz, Neu-Anspach; Edwin Czarnetzki, Elz, both of Germany

[73] Assignee: ITT Automotive Europe GmbH, Germany

[*] Notice: This patent issued on a continued prosecution application filed under 37 CFR 1.53(d), and is subject to the twenty year patent term provisions of 35 U.S.C. 154(a)(2).

[21] Appl. No.: 586,747
[22] PCT Filed: Jul. 20, 1994
[86] PCT No.: PCT/EP94/02380
§ 371 Date: Jun. 6, 1996
§ 102(e) Date: Jun. 6, 1996
[87] PCT Pub. No.: WO95/03961
PCT Pub. Date: Feb. 9, 1995

[30] Foreign Application Priority Data

Jul. 29, 1993 [DE] Germany ............... 43 25 412.8

[51] Int. Cl.⁶ ............................................. B60T 8/36
[52] U.S. Cl. .................... 303/119.2; 303/119.3; 137/884
[58] Field of Search ............... 303/119.2, 119.3; 137/596.16, 596.17, 884

[56] References Cited

U.S. PATENT DOCUMENTS 5,141,298   8/1992   Von Hayn et al. ............... 303/119.2

FOREIGN PATENT DOCUMENTS

| 4104804 | 8/1992 | Germany . |
| 4135745 | 5/1993 | Germany . |
| WO 89/10286 | 11/1989 | WIPO . |
| WO 92/08630 | 5/1992 | WIPO . |
| WO 92/12878 | 8/1992 | WIPO . |

OTHER PUBLICATIONS

Richl, Helmuth: Trends bei der Entwicklung von Hydraulik–Ventilmagneten. In: 0+P 01hydraulik und Pneumatik 35, 1991, Nr.8, s.613–619.

*Primary Examiner*—Peter M. Poon
*Attorney, Agent, or Firm*—J. Gordon Lewis; Thomas N. Twomey

[57] ABSTRACT

An electrohydraulic control mechanism having a simplified coil arrangement which provides a compact, functionally optimized configuration of coils relative to their support element, with added ease of manufacture and maintenance. The differing thermal expansions of assembly components and their respective tolerances are compensated for in stress-free fashion. These desirable features are obtained by placing bushes on the underside of an essentially flat panel support element. These bushes respond to spring elements arrayed alongside valve domes.

6 Claims, 2 Drawing Sheets

ELECTROHYDRAULIC PRESSURE CONTROL MECHANISM

TECHNICAL FIELD

The invention generally relates to electrohydraulic pressure control mechanisms, and more particularly to a brake (retarder) pressure control mechanism.

BACKGROUND OF THE INVENTION

An electrohydraulic pressure control mechanism of generic designation is described in the international publication WO 92/12878. Here, aside from the commonly known modular assembly of the valve housing, the lid is sectioned by way of a flat panel support element. For one, the design serves the purpose of accommodating an electronic regulator or parts thereof and, secondarily, it establishes an electric connection between the electronic regulator and the overhead contact elements of the electromagnetic valves. The lid, along with the coils of the electromagnetic valves, is attached to the valve domes of the valve housing. Insert contacts lock to bring about an electric connection between the contact elements and the electronic or electric components now integrated in the lid. Recommended fastening of the coils to the support element is achieved by the use of elastic mounts (such as springs) or else by embedding the coils into an elastic moulding box. However, these elastic mounts prove to be unduly cumbersome in terms of their configuration.

It is the intent of the present invention to improve the conventional state of technology pressure control mechanism. The goal is to achieve a simplified coil configuration and to arrive at a compact, yet functionally optimal coil arrangement to harmonize with the support element. Its purpose is to ease the manufacture and maintenance of the pressure control mechanism, while still accommodating differing thermal expansions of assembly components and their respective tolerances being compensated for in a stress-free fashion.

The present invention accomplishes these objective by having on the underside of an essentially flat panel support element, bushes attached which respond to spring elements arrayed alongside the valve domes.

DETAILED DESCRIPTION OF THE PREFERRED EMBODIMENTS

Figure 1:
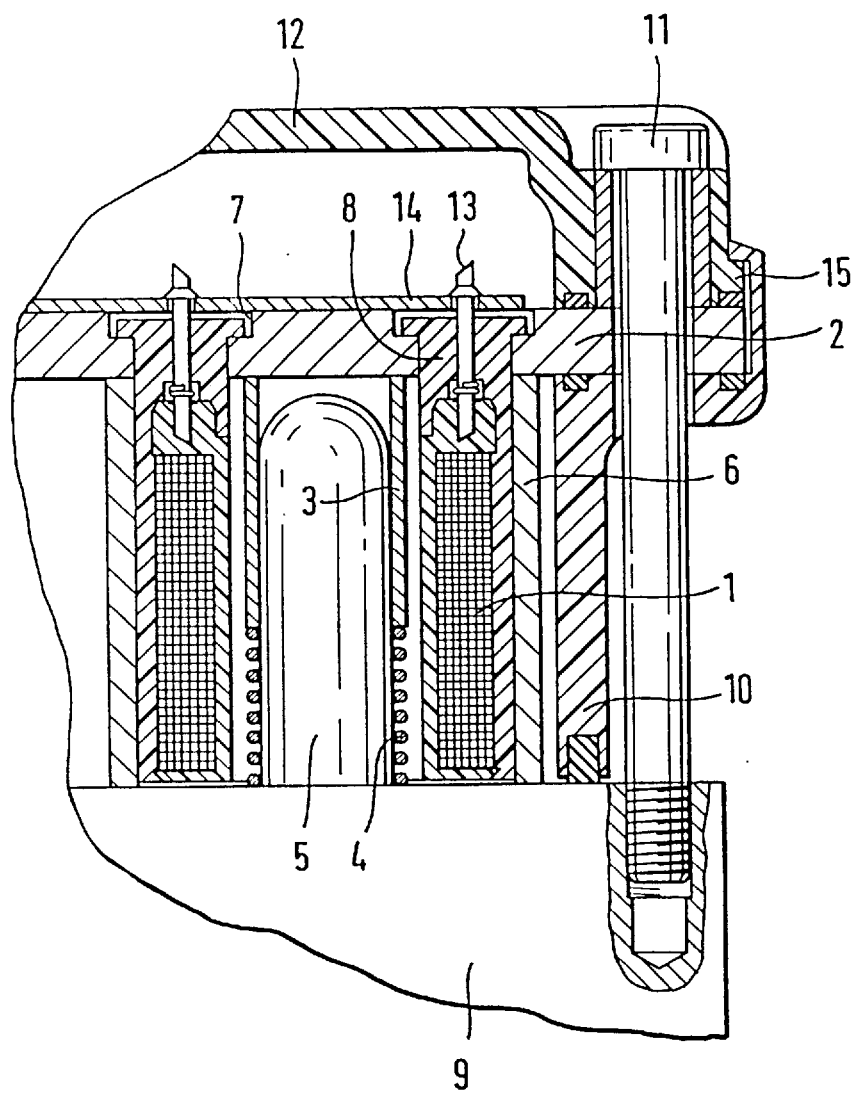
FIG. 1 is a cross sectional view of the conceptual pressure control mechanism of the present invention.

FIG. 1 shows a side projection of the pressure control mechanism of the present invention with an outline of the basic components. The depicted right section of the mechanism consists of a profile of lid 12 which rests on support element 2, and its several strip conductors (tracks) 14. Below support element 2, a frame 10 delimits one of several coils 1 of the electromagnetic valves. For reception of contact elements 13 (jutting out from coils 1) the support element 2 is equipped with several lead-throughs 7 which are filled with sealer 8 of coils 1. The sealer 8 is formed from a plastic, which is anchored to the support element 2 of each coil. Support element 2 is a steel plate sandwiched between lid 12 and valve housing 9 and resting in an essentially horizontal position on the contact elements 13 of coils 1. It has bonded to its lower side tubular elements 6 which accept coils 1, in turn being protected by sealer 8. Tubular elements 6 of steel are welded to the underside of support element 2. The block shaped valve housing 9 is also formed from steel and bears valve domes 5. After spring elements 4 and bushes 3 are attached to coils 1 (being anchored to the support element 2) the latter is fitted onto valve domes 5, which have been arranged in two parallel rows (not specifically shown). Relative to coils 1, the bushes 3, being under the load of pressure springs, exhibit a large-dimensioned radial air gap which permits alignment and docking of coils 1 with valve housing 9. This is done independently of assembly component tolerances. The differential of vertical assembly component tolerances in the field of coil suspension is compensated for by the elastic support of bush 3. Despite comparatively large component tolerances, the conceptual positing of flexure bush 3 on valve dome 5 assures the integrity of the magnetic circuit between valve housing 9, tubular element 6, support element 2, bush 3 and, by way of valve dome 5, the magnetic core (not shown) inside valve dome 5. The rim of frame 10, overhanging lid projection 15, constitutes a single unit encompassing lid 12 and support element 2. Screws on either side of the assembly unit (tension rod 11) attach it to valve housing 9.

Figure 2:
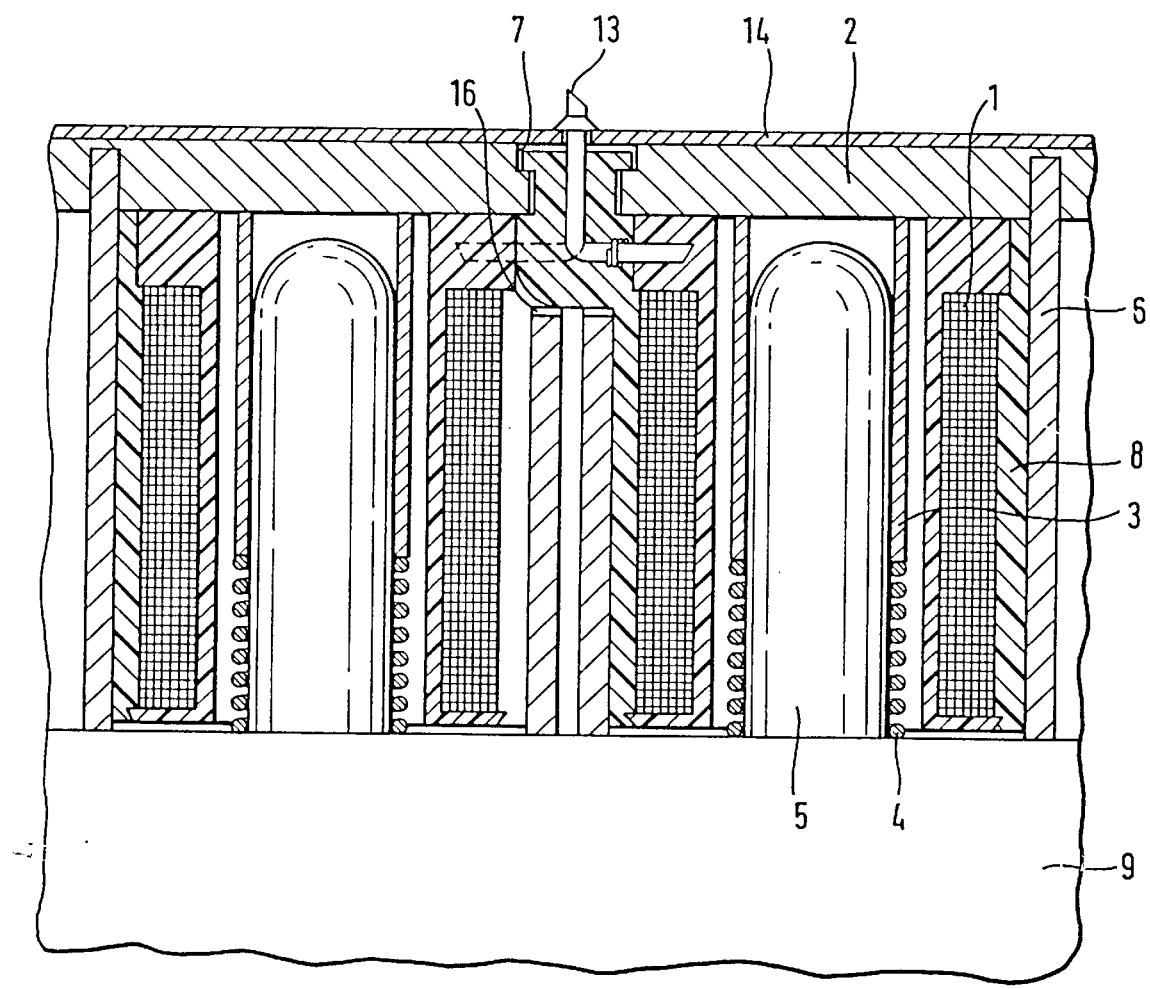
FIG. 2 is a top view of a second embodiment of the present invention showing the electric contact elements in a side projection of the pressure control mechanism.

FIG. 2 shows the axial section of a second embodiment showing a different configuration of coils on support element 2. Diverging from FIG. 1, the tubular units 6 and support element 2 form a press fit, for the purpose of which support element 2 is equipped with ring nuts on its underside. Between the adjacent surface areas of tubular unit 6, there is available an area for the centralized positioning of contact elements 13, hence the aperture 16 in tubular units 6. The contact elements 13, jutting out radially and pointing at another, are crimped upward at right angles and laminated by sealer 8 of each coil 1. Thus, two contact elements 13 of each coil 1 form one unit, being insulated with sealer 8 of coil 1 and jutting out from the side of coil 1. The units are arrayed tightly and sequentially (relative to the perpendicular of the drawing plane) between adjacent coils 1 and in true alignment with successively located apertures 7, leading up to contact with strip conductors 14. The positioning of the contact elements (see FIG. 1 on either side of each valve dome 5, within the gaps of adjacent valve domes) yields considerable space advantages above support element 2. It offers space for electronic controls, providing substantial leeway for the layout and configuration of electric and/or electronic components. Additionally, lid 12 lends itself to a more compact design.

In summation, it may be stated that the invention obviates the need for elastic mounting of the coils, or elastic mold boxes. Extensive, large-scale laminating and/or reforging of coils becomes redundant. Cleaning, and problems of deformation are avoided. The support element 2, together with tubular units 6 and sealer 8 forms a simple-to-produce unit to accommodate coils 1, whereby these coils together with sealer 8, provide a compressed connection with tubular unit 6, thus relieving tension on contact elements 13 and strip conductors (tracks) 14. The use of simple-to-produce bushes 3 from rope material makes possible,(independent of component tolerances), the positioning of coils 1 along valve domes 5, achieving a closed magnetic circuit. The horizontal and vertical distances of coils 1 to valve domes 5 can be of liberal proportions which eases the installation process of the electric assembly group on valve housing 9.

We claim:

1. Electrohydraulic control mechanism of the type including electromagnetic, hydraulic valves arrayed on a valve housing, coils overhanging the valve housing equipped with contact elements which in turn are protected by a lid, covering said coils and contact elements, comprising a support element contained within said lid for accommodating the coils wherein at least part of said lid accommodates installation of electric terminals wherein, the underside of said support element includes bushes in contact with spring elements arrayed alongside the valve housing; and said valve housing includes a frame and wherein said support element is mounted by means of a tensioning rod between said frame and said lid.

2. Electromagnetic pressure control mechanism according to claim 1, further including a plurality of tubular units attached to said support element.

3. Electromagnetic pressure control mechanism according to claim 1, wherein said support element includes leads.

4. Electromagnetic pressure control mechanism according to claim 1, wherein at least one of said coils is enclosed with a sealer, and wherein said housing includes a tubular unit and said coils is press fit within said tubular unit.

5. Electrohydraulic pressure control mechanism, according to claim 4, wherein said coils are paired and said coils include said contact elements, wherein the contact elements of said paired coils are spaced next to one another within the sealer of said coils, with the contact elements jutting out of the coils in radial fashion and in the direction of the lead.

6. Electromagnetic pressure control mechanism according to claim 1, wherein said lid includes an overhanging projection near its outer periphery and said overhanging projection interlocks with a portion of said valve housing to positively retain said lid to said valve housing.

* * * * *